United States Patent
Yin et al.

(10) Patent No.: US 6,898,080 B2
(45) Date of Patent: *May 24, 2005

(54) PORTABLE COMPUTER DOCKING STATION WITH MOVABLE ELECTRICAL INTERFACE

(75) Inventors: Memphis Zhihong Yin, Corvallis, OR (US); Dennis R Esterberg, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 4 days.

This patent is subject to a terminal disclaimer.

(21) Appl. No.: 10/678,809

(22) Filed: Oct. 3, 2003

(65) Prior Publication Data

US 2004/0057204 A1 Mar. 25, 2004

Related U.S. Application Data

(63) Continuation of application No. 10/041,801, filed on Jan. 7, 2002, now Pat. No. 6,683,786.

(51) Int. Cl.[7] .................................................. G06F 1/16
(52) U.S. Cl. ....................................... 361/686; 710/303
(58) Field of Search ................................. 361/683, 686; 710/303, 304

(56) References Cited

U.S. PATENT DOCUMENTS

| | | | |
|---|---|---|---|
| 5,452,180 A | | 9/1995 | Register et al. |
| 5,535,093 A | * | 7/1996 | Noguchi et al. ............ 361/686 |
| 5,604,663 A | | 2/1997 | Shin et al. |
| 5,870,283 A | | 2/1999 | Maeda et al. |
| 5,875,094 A | | 2/1999 | Kirkendoll |
| 5,899,421 A | | 5/1999 | Silverman |
| 6,188,572 B1 | | 2/2001 | Liao et al. |
| 6,264,484 B1 | | 7/2001 | Chien et al. |
| 6,264,488 B1 | * | 7/2001 | Helot et al. ................. 439/341 |
| 6,301,106 B1 | | 10/2001 | Helot et al. |
| 6,309,230 B2 | | 10/2001 | Helot |
| 6,396,687 B1 | | 5/2002 | Sun et al. |

* cited by examiner

Primary Examiner—Darren Schuberg
Assistant Examiner—Anthony Q. Edwards

(57) ABSTRACT

A docking station for a portable computer includes a housing, and an electrical interface supported by the housing and configured to electrically couple the docking station and the portable computer. The electrical interface is movable between a first position and a second position angularly displaced from the first position.

49 Claims, 6 Drawing Sheets

PORTABLE COMPUTER DOCKING STATION WITH MOVABLE ELECTRICAL INTERFACE

CROSS-REFERENCE TO RELATED APPLICATIONS

This application is a Continuation of U.S. patent application Ser. No. 10/041,801 filed on Jan. 7, 2002 now U.S. Pat. No. 6,683,786, which is incorporated herein by reference.

THE FIELD OF THE INVENTION

The present invention relates generally to portable computers, and more particularly, to a docking station including a movable electrical interface for a portable computer.

BACKGROUND OF THE INVENTION

Portable computers such as laptop or notebook computers have become increasingly popular due to their light weight and compact size. Such computers can be easily carried and transported from one place to another. In addition, as portable computers typically include battery power, such computers can be operated almost anywhere.

To increase a functionality of a portable computer, one or more external or peripheral devices such as a mouse, keyboard, monitor, printer, A/C power adapter, CD-ROM drive, etc. can be operably coupled with the portable computer. Each of these devices, however, must be individually connected to the portable computer. Unfortunately, connecting and disconnecting each of these devices with the portable computer is a tedious task, especially if the portable computer is regularly transported from one place to another.

Docking stations have been designed to alleviate the task of individually connecting and disconnecting external or peripheral devices with the portable computer by facilitating operable coupling of the portable computer with external or peripheral devices either housed in the docking station (e.g., a CD-ROM drive) or connected to the docking station (e.g., a mouse, keyboard, monitor, printer, A/C power adapter). More specifically, the peripheral devices are operably coupled with the docking station such that when the portable computer is docked or operably coupled with the docking station, the portable computer is operably coupled with the peripheral devices.

A typical docking station includes an electrical connector or interface which mates with an electrical connector or interface of the portable computer to electrically couple the docking station and the portable computer. Typically, the docking station is only compatible with a portable computer having an electrical interface in a corresponding location. Thus, different docking stations with differing electrical interface locations are required to accommodate differing locations of the electrical interface of the portable computer. Conversely, design freedom of the portable computer including, more specifically, location of the electrical interface of the portable computer is limited because of the need for the portable computer to be compatible with the docking station.

Accordingly, a need exists for a docking station which includes an electrical interface that is movable to accommodate differing locations of an electrical interface of a portable computer.

SUMMARY OF THE INVENTION

One aspect of the present invention provides a docking station for a portable computer. The docking station includes a housing, and an electrical interface supported by the housing and configured to electrically couple the docking station and the portable computer. The electrical interface is movable between a first position and a second position angularly displaced from the first position.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Since components of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
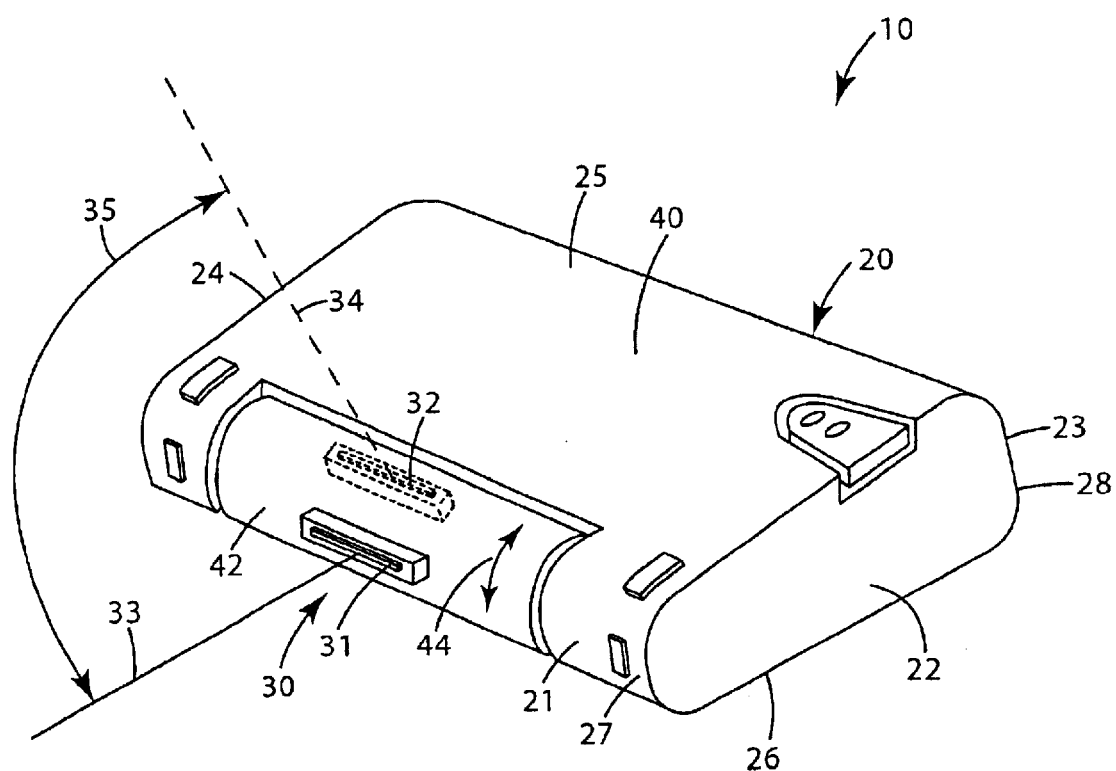
FIG. 1 is a front perspective view illustrating one embodiment of a docking station for a portable computer according to the present invention.

FIG. 1 illustrates one embodiment of a docking station 10 according to the present invention. Docking station 10 provides operable connection between a portable computer 12 (FIGS. 2A and 2B) and one or more external or peripheral devices (not shown) such as a mouse, keyboard, monitor, printer, A/C power adapter, CD-ROM drive, etc. More specifically, one or more peripheral devices are connected to docking station 10 such that when portable computer 12 is operably coupled or docked with docking station 10, docking station 10 provides electrical coupling between portable computer 12 and the peripheral devices. As such, the peripheral devices can maintain their connection with docking station 10 when portable computer 12 is separated or undocked from docking station 10. Thus, to reconnect portable computer 12 with the peripheral devices, portable computer 12 is simply docked with docking station 10.

Portable computer 12 includes any type of portable computing device such as a notebook or laptop computer as well as a personal digital assistant (PDA) or other hand-held computing device. Portable computer 12 includes, for example, a keyboard or keypad and a display, as is well known in the art. In addition, portable computer 12 includes an electrical interface which mates with a corresponding electrical interface of docking station 10, as described below.

Docking station 10 includes a housing 20 and an electrical interface 30 which is supported by housing 20. Housing 20 includes sides 21, 22, 23, and 24, a top surface 25, and a bottom surface 26. In one embodiment, side 21 forms a front surface 27 of housing 20 and side 23 forms a back surface 28 of housing 20. As such, top surface 25 is adjacent to front surface 27 and back surface 28.

Electrical interface 30 of docking station 10 is movable and, more specifically, angularly adjustable relative to housing 20 to accommodate differing locations of an electrical interface of portable computer 12, as described in detail below. Electrical interface 30 is movable, for example, between a first position 31 and a second position 32. Second position 32 is angularly displaced from first position 31 such that an axis 33 oriented substantially perpendicular to electrical interface 30 in first position 31 and an axis 34 oriented substantially perpendicular to electrical interface 30 in second position 32 are displaced at an angle 35. As such, electrical interface 30 is movable between first position 31 and second position 32 to correspond to differing locations of an electrical interface of portable computer 12, as described below.

In one embodiment, first position 31 of electrical interface 30 includes a substantially horizontal position such that axis 33 is oriented substantially parallel with bottom surface 26 of housing 20, and second position 32 of electrical interface 30 includes a non-horizontal position such that axis 34 is oriented at an angle to bottom surface 26 of housing 20. While electrical interface 30 is illustrated as being movable between a first position and a second position, it is understood that the second position of electrical interface 30 may include one or more second positions of electrical interface 30.

In one embodiment, to facilitate movement of electrical interface 30 of docking station 10 between first position 31 and second position 32, housing 20 includes a stationary housing portion 40 and a movable housing portion 42. Stationary housing portion 40 supports movable housing portion 42 such that movable housing portion 42 can rotate, as indicated by double arrow 44, relative to stationary housing portion 40. Movable housing portion 42 rotates, for example, about a transverse axis extending between sides 22 and 24 of housing 20. Electrical interface 30 is supported by movable housing portion 42 such that rotation of movable housing portion 42 establishes first position 31 and second position 32 of electrical interface 30.

Figure 2A:
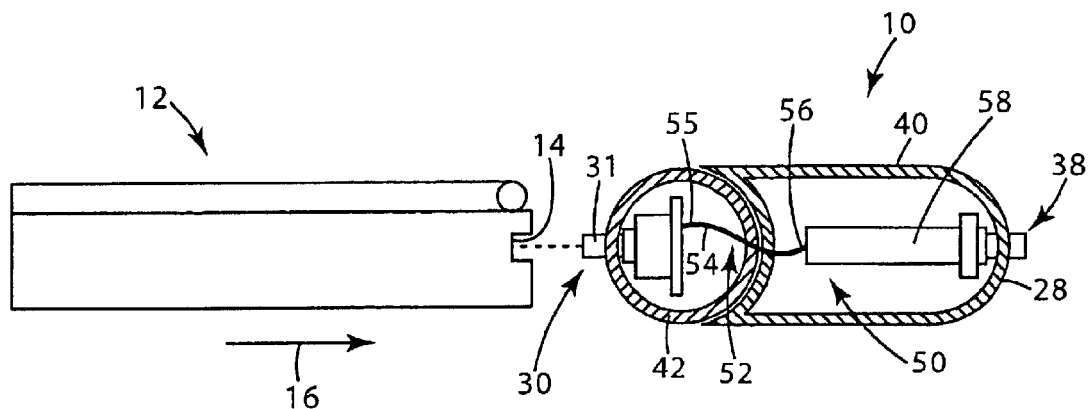
FIG. 2A is a schematic cross-sectional view illustrating one embodiment of the docking station of FIG. 1 in a first position.
Figure 2B:
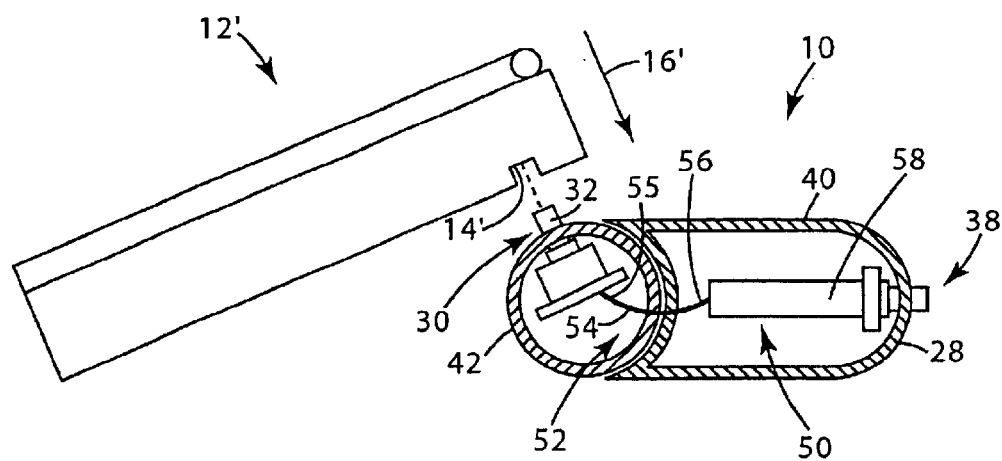
FIG. 2B is a schematic cross-sectional view illustrating one embodiment of the docking station of FIG. 1 in a second position.

As illustrated in FIGS. 2A and 2B, electrical interface 30 of docking station 10 mates with an electrical interface 14 of portable computer 12 to operably couple docking station 10 and portable computer 12. For example, electrical interface 30 of docking station 10 may be a male pin connector and electrical interface 14 of portable computer 12 may be a female receptacle connector which mates with and receives the male pin connector of electrical interface 30 of docking station 10. As such, portable computer 12 is electrically coupled with docking station 10.

FIG. 2A illustrates docking of one embodiment of portable computer 12 with docking station 10. As illustrated in FIG. 2A, electrical interface 14 of portable computer 12 is provided on a side or, more specifically, back of portable computer 12. As such, electrical interface 30 of docking station 10 is positioned in first position 31 such that electrical interface 30 is oriented substantially perpendicular to electrical interface 14 of portable computer 12. Thus, to dock portable computer 12 with docking station 10, portable computer 12 is moved toward docking station 10, as indicated by arrow 16, to mate electrical interface 14 of portable computer 12 with electrical interface 30 of docking station 10 and electrically couple portable computer 12 with docking station 10.

FIG. 2B illustrates docking of another embodiment of portable computer 12 with docking station 10. As illustrated in FIG. 2B, an electrical interface 14' of a portable computer 12' is provided on a bottom of portable computer 12'. As such, electrical interface 30 of docking station 10 is positioned in second position 32 such that electrical interface 30 is oriented substantially perpendicular to electrical interface 14' of portable computer 12'. Thus, to dock portable computer 12' with docking station 10, portable computer 12' is moved toward docking station 10, as indicated by arrow 16', to mate electrical interface 14' of portable computer 12' with electrical interface 30 of docking station 10 and electrically couple portable computer 12' with docking station 10. While portable computer 12 is illustrated as including electrical interface 14 and portable computer 12' is illustrated as including electrical interface 14', it is within the scope of the present invention for portable computer 12 to include both electrical interface 14 and electrical interface 14'. As such, a user of portable computer 12 and docking station 10 can select either first position 31 or second position 32 of electrical interface 30.

In one embodiment, as illustrated in FIGS. 2A and 2B, docking station 10 includes a second electrical interface 38. Second electrical interface 38 is supported by housing 20 and, more specifically, stationary housing portion 40 of housing 20. In one embodiment, second electrical interface 38 is provided on back surface 28 of housing 20. Second electrical interface 38 includes, for example, one or more connectors which allow one or more peripheral devices such as a mouse, keyboard, monitor, printer, A/C power adapter, and/or CD-ROM drive to be operably connected with docking station 10, as is well known in the art.

Second electrical interface 38 is electrically coupled with electrical interface 30. As such, docking station 10 includes an electrical circuit 50 which electrically couples electrical interface 30 with second electrical interface 38. Electrical circuit 50 includes, for example, an electrical connection 52 which accommodates rotation of movable housing portion 42 relative to stationary housing portion 40 as electrical interface 30 is moved between first position 31 and second position 32.

In one embodiment, as illustrated in FIGS. 2A and 2B, electrical connection 52 of electrical circuit 50 includes a flexible wire connector 54. Flexible wire connector 54 includes, for example, a flexible multi-conductor ribbon cable which allows movable housing portion 42 to rotate relative to stationary housing portion 40 while enabling electrical interface 30 to remain electrically coupled with electrical components 58. As such, a first end 55 of flexible wire connector 54 is electrically coupled with electrical interface 30 and a second end 56 of flexible wire connector 54 is electrically coupled with one or more electrical components 58 of electrical circuit 50. Electrical components 58 include, for example, a printed circuit board to which flexible wire connector 54 is electrically coupled and input/ output connectors which are mounted on the printed circuit board. Electrical components 58 are electrically coupled with second electrical interface 38 such that flexible wire connector 54 is electrically coupled with second electrical interface 38 via electrical components 58.

Figure 3A:
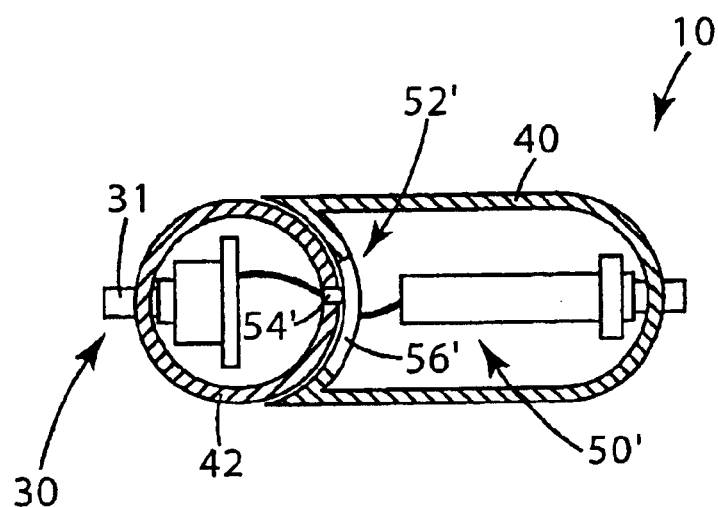
FIG. 3A is a schematic cross-sectional view similar to FIG. 2A illustrating another embodiment of the docking station of FIG. 1 in a first position.
Figure 3B:
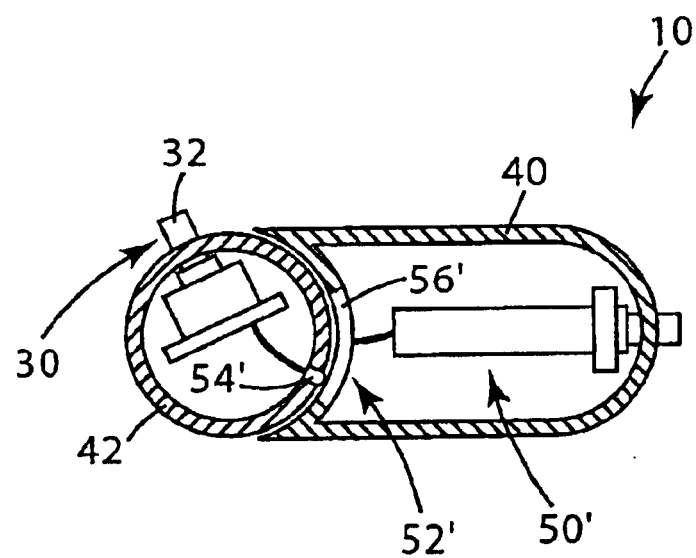
FIG. 3B is a schematic cross-sectional view similar to FIG. 2B illustrating another embodiment of the docking station of FIG. 1 in a second position.

FIGS. 3A and 3B illustrate another embodiment of electrical circuit 50 of docking station 10. Similar to electrical circuit 50, electrical circuit 50' electrically couples electrical interface 30 with second electrical interface 38. In addition, electrical circuit 50' includes, for example, an electrical connection 52' which accommodates rotation of movable housing portion 42 relative to stationary housing portion 40 as electrical interface 30 is moved between first position 31 and second position 32. While electrical connection 52 of electrical circuit 50 includes a hard-wired electrical connection (e.g., flexible wire connector 54), electrical connection 52' of electrical circuit 50' includes a direct contact electrical connection. More specifically, electrical connection 52' includes an electrical contact 54' which is electrically coupled with electrical interface 30 and an electrical contact 56' which is electrically coupled with second electrical interface 38. Electrical contact 54' is supported by movable housing portion 42 and electrical contact 56' is supported by stationary housing portion 40 such that electrical contact 54' and electrical contact 56' make and/or maintain electrical contact when moveable housing portion 42 is rotated relative to stationary housing portion 20 to establish first position 31 and second position 32 of electrical interface 30.

In one embodiment, electrical contact 54' includes an electrical node and electrical contact 56' includes an electrical contact pad. As such, sufficient pressure is maintained between the electrical node and the electrical contact pad to provide electrical coupling between electrical contact 54' and electrical contact 56' when electrical interface 30 is moved between first position 31 and second position 32. While electrical contact 54' is illustrated and described as being an electrical node and electrical contact 56' is illustrated and described as being an electrical contact pad, it is understood that electrical contact 54' may be an electrical contact pad and that electrical contact 56' may be an electrical node. In addition, while electrical connections 52 and 52' are illustrated as being hard-wired or direct contact electrical connections, it is within the scope of the present invention for electrical connection 52 to include other electrical connections including a wireless or non-contact electrical connection such as an infrared communication.

Figure 4:
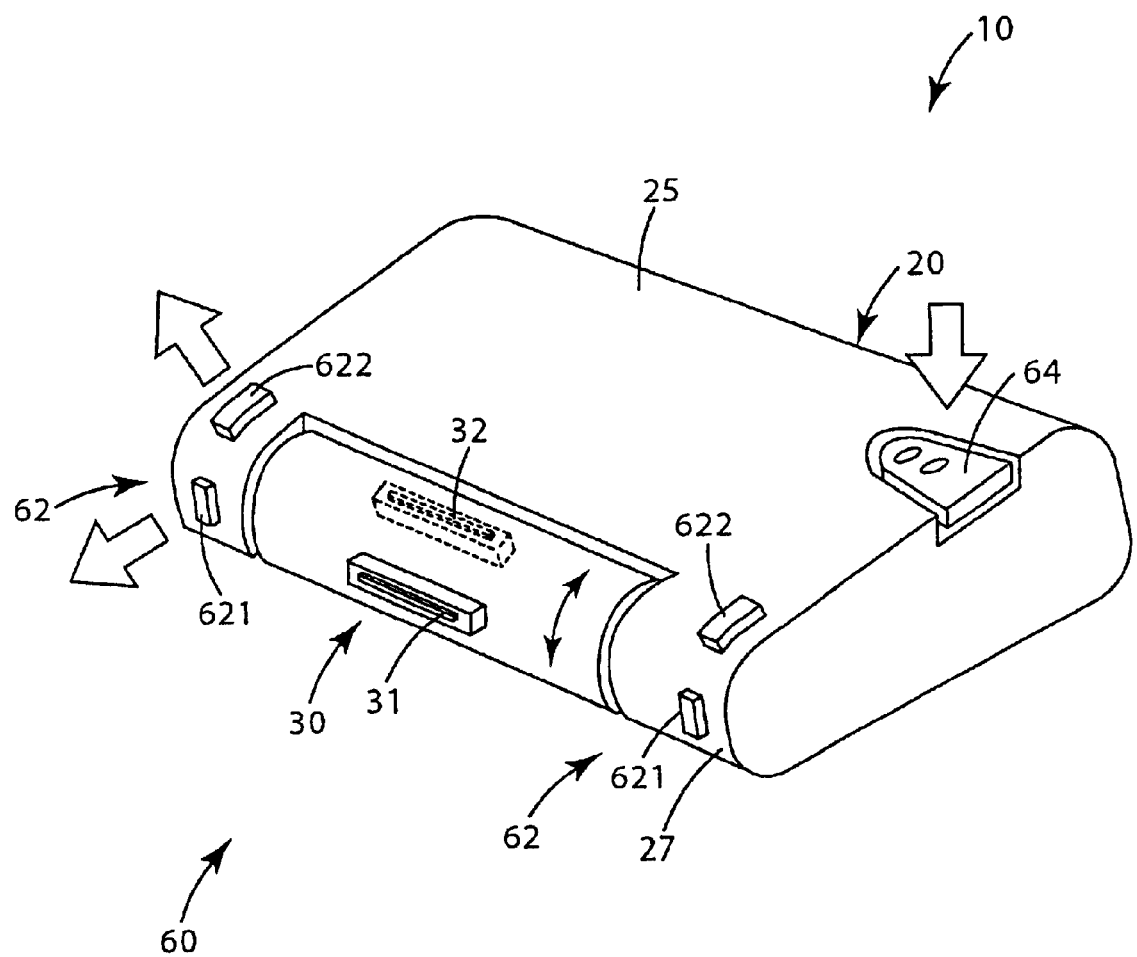
FIG. 4 is a front perspective view illustrating one embodiment of an undocking system of the docking station of FIG. 1 according to the present invention.

In one embodiment, as illustrated in FIG. 4, docking station 10 includes a decoupling or undocking system 60. Undocking system 60 displaces portable computer 12 relative to housing 20 of docking station 10 when portable computer 12 and docking station 10 are operably coupled. To displace portable computer 12 relative to housing 20, undocking system 60 includes one or more ejectors 62 which are actuated to project from housing 20 and contact and displace portable computer 12 when portable computer 12 is docked with docking station 10.

Undocking system 60 also includes an actuation button 64 for controlling operation of ejectors 62. More specifically, manipulation of actuation button 64 when portable computer 12 is docked with docking station 10 causes ejectors 62 to push against portable computer 12 and displace portable computer 12 relative to housing 20. Thus, electrical interface 14 of portable computer 12 is decoupled from electrical interface 30 of docking station 10 and portable computer 12 is undocked from docking station 10.

In one embodiment, ejectors 62 include a first set of ejectors 621 which project from housing 20 and contact portable computer 12 when portable computer 12 is docked with docking station 10 while electrical interface 30 of docking station 10 is in first position 31, and a second set of ejectors 622 which project from housing 20 and contact portable computer 12 when portable computer 12 is docked with docking station 10 while electrical interface 30 of docking station 10 is in second position 32. As such, ejectors 621 project from front surface 27 of housing 20 and ejectors 622 project from top surface 25 of housing 20. While actuation button 64 is illustrated as being provided on top surface 25 of housing 20, it is understood that actuation button 64 may be provided on other sides and/or surfaces of housing 20.

Figure 5:
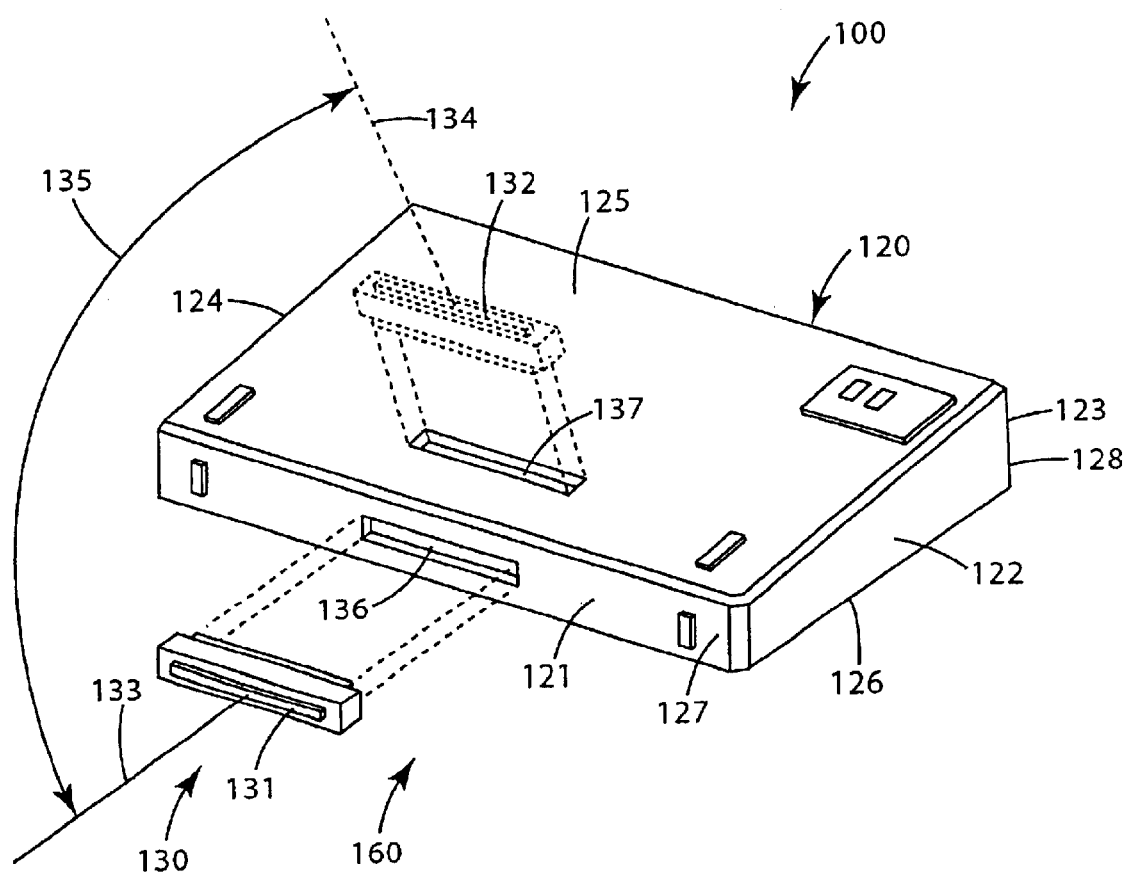
FIG. 5 is a front perspective view illustrating another embodiment of a docking station for a portable computer according to the present invention.

FIG. 5 illustrates another embodiment of docking station 10. Docking station 100, similar to docking station 10, includes a housing 120 and an electrical interface 130 which is supported by housing 120. In addition, housing 120 includes sides 121, 122, 123, and 124, a top surface 125, and a bottom surface 126. In one embodiment, side 121 forms a front surface 127 of housing 120 and side 123 forms a back surface 128 of housing 120. As such, top surface 125 of housing 120 is adjacent to front surface 127 and back surface 128.

Similar to electrical interface 30, electrical interface 130 of docking station 100 mates with electrical interface 14 of portable computer 12 to operably couple docking station 100 and portable computer 12. Also, similar to electrical interface 30, electrical interface 130 of docking station 100 is movable and, more specifically, angularly adjustable relative to housing 120 to accommodate differing locations of electrical interface 14 of portable computer 12. Electrical interface 130 is movable, for example, between a first position 131 and a second position 132. Second position 132 is angularly displaced from first position 131 such that an axis 133 oriented substantially perpendicular to electrical interface 130 in first position 131 and an axis 134 oriented substantially perpendicular to electrical interface 130 in second position 132 are displaced at an angle 135. As such, electrical interface 130 is movable between first position 131 and second position 132 to correspond to differing locations of electrical interface 14 of portable computer 12.

In one embodiment, first position 131 of electrical interface 130 includes a substantially horizontal position such that axis 133 is oriented substantially parallel with bottom surface 126 of housing 120, and second position 132 of electrical interface 130 includes a non-horizontal position such that axis 134 is oriented at an angle to bottom surface 126 of housing 120. In one embodiment, top surface 125 of housing 120 is angled relative to front surface 127 of housing 120 such that top surface 125 supports portable computer 12 when portable computer 12 is docked with docking station 100 while electrical interface 130 is in second position 132. As such, electrical interface 130 is oriented substantially perpendicular to top surface 125 of housing 120 when electrical interface 130 is in second position 132.

In one embodiment, to facilitate movement of electrical interface 130 of docking station 100 between first position 131 and second position 132, housing 120 includes a first electrical port 136 and a second electrical port 137. First electrical port 136 and second electrical port 137 are angularly displaced such that electrical interface 130 is selectively positioned in first electrical port 136 and second electrical port 137 to establish first position 131 and second position 132, respectively, of electrical interface 130. More specifically, first electrical port 136 is provided in front surface 127 of housing 120 and second electrical port 137 is provided in top surface 125 of housing 120. As such, electrical interface 130 is selectively positioned on front surface 127 and top surface 125.

Figure 6:
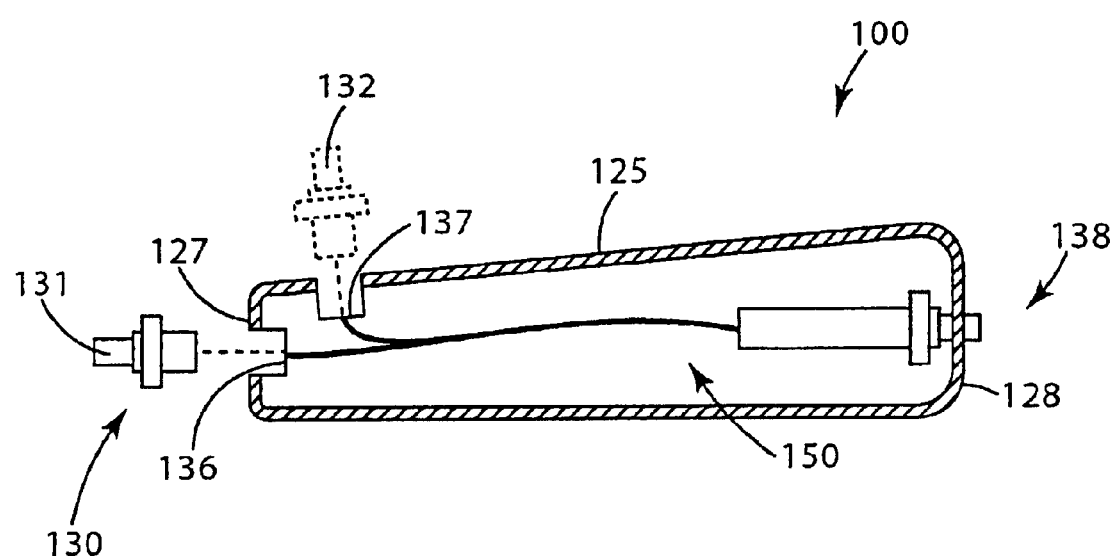
FIG. 6 is a schematic cross-sectional view illustrating one embodiment of the docking station of FIG. 5.

As illustrated in FIG. 6 and similar to docking station 10, docking station 100 includes a second electrical interface 138. Second electrical interface 138 is supported by housing 120 and electrically coupled with electrical interface 130. As such, docking station 100 includes an electrical circuit 150 which electrically couples electrical interface 130 with second electrical interface 138. Electrical circuit 150 includes, for example, first electrical port 136 and second electrical port 137, as well as other electrical connectors and components. In one embodiment, second electrical interface 138 is provided on back surface 128 of housing 120 and includes, for example, one or more connectors which allow one or more peripheral devices such as a mouse, keyboard, monitor, printer, A/C power adapter, and/or CD-ROM drive to be operably connected with docking station 100, as is well known in the art. In addition, as illustrated in FIG. 5, docking station 100 also includes an undocking system 160 similar to undocking system 60, as described above with reference to docking station 10.

By providing docking stations 10 and 100 with moveable electrical interfaces 30 and 130, respectively, docking stations 10 and 100 accommodate differing locations of an electrical interface of portable computer 12. For example, docking stations 10 and 100 accommodate electrical interface 14 as provided on a side or, more specifically, back of portable computer 12, as well as electrical interface 14' provided on a bottom of portable computer 12'. Thus, different docking stations with differing electrical interface locations are not necessary to accommodate differing locations of an electrical interface of a portable computer. In addition, design freedom of the portable computer including, more specifically, possible locations for the electrical interface of the portable computer is increased since the single docking station is compatible with differing locations of the electrical interface of the portable computer.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A docking station for a portable computer, the docking station comprising:
    a housing including a first surface and a second surface adjacent the first surface; and
    an electrical interface supported by the housing,
    wherein the electrical interface is movable between a first position and a second position angularly displaced from the first position, wherein the electrical interface is oriented substantially perpendicular to the first surface when in the first position and oriented substantially perpendicular to the second surface when in the second position, and wherein the electrical interface is configured to electrically couple the docking station and the portable computer when in each the first position and the second position.

2. The docking station of claim 1, wherein the first position includes a substantially horizontal position and the second position includes a non-horizontal position.

3. The docking station of claim 1, wherein the first surface of the housing is substantially vertical and the second surface of the housing is angled relative to the first surface.

4. The docking station of claim 1, wherein the electrical interface of the docking station is configured to mate with a corresponding electrical interface of the portable computer to electrically couple the docking station and the portable computer.

5. The docking station of claim 4, further comprising:
    an undocking system adapted to displace the portable computer relative to the housing when the docking station and the portable computer are electrically coupled.

6. The docking station of claim 5, wherein the undocking system includes at least one ejector adapted to project from the housing and contact the portable computer when the decking station and the portable computer are electrically coupled.

7. The docking station of claim 1, wherein the housing includes a first housing portion and a second housing portion supporting the first housing portion, the first housing portion supporting the electrical interface and being movable relative to the second housing portion to establish the first position and the second position of the electrical interface.

8. The docking station of claim 7, wherein the first housing portion is rotatable relative to the second housing portion to establish the first position and the second position of the electrical interface.

9. The docking station of claim 7, wherein the electrical interface constitutes a first electrical interface supported by the first housing portion, and further comprising:
    a second electrical interface supported by the second housing portion and electrically coupled to the first electrical interface,
    wherein the second electrical interface is configured to electrically couple a peripheral device with the docking station.

10. The docking station of claim 1, wherein the housing includes a first electrical port and a second electrical port angularly displaced from the first electrical port, wherein the electrical interface is selectively positionable in the first electrical port and the second electrical port to establish the first position and the second position of the electrical interface.

11. The docking station of claim 10, wherein the electrical interface constitutes a first electrical interface supported by the housing, and further comprising:
    a second electrical interface supported by the housing and electrical coupled with the first electrical port and the second electrical port,
    wherein the second electrical interface is configured to electrically couple a peripheral device with the docking station.

12. A method of docking a portable computer including an electrical interface with a docking station including a housing and an electrical interface supported by the housing, the housing including a first surface and a second surface adjacent the first surface, the method comprising:
    moving the electrical interface of the docking station between a first position and a second position angularly displaced from the first position, including orienting the electrical interface substantially perpendicular to the first surface of the housing when in the first position and orienting the electrical interface substantially perpendicular to the second surface of the housing when in the second position; and electrically coupling the electrical interface of the portable computer with the electrical interface of the docking station when the electrical interface of the docking station is in each the first position and the second position.

13. The method of claim 12, wherein moving the electrical interface of the docking station between the first position and the second position includes moving the electrical interface between a substantially horizontal position and a non-horizontal position.

14. The method of claim 12, further comprising:
undocking the portable computer from the docking station after electrically coupling the electrical interface of the portable computer with the electrical interface of the docking station, including displacing the portable computer relative to the housing of the docking station.

15. The method of claim 14, wherein displacing the portable computer relative to the housing of the docking station includes contacting the portable computer with at least one ejector.

16. The method of claim 12, wherein the housing of the docking station includes a first housing portion supporting the electrical interface of the docking station and a second housing portion supporting the first housing portion, wherein moving the electrical interface of the docking station between the first position and the second position includes moving the first housing portion relative to the second housing portion to establish the first position and the second position of the electrical interface.

17. The method of claim 16, wherein moving the first housing portion relative to the second housing pardon includes rotating the first housing portion relative to the second housing portion to establish the hint position and the second position of the electrical interface.

18. The method of claim 12, wherein the housing of the docking station includes a first electrical port and a second electrical port angularly displaced from the first electrical port, wherein moving the electrical interface of the docking station between the first position and the second position includes selectively positioning the electrical interface of the docking station in the first electrical port and the second electrical port to establish the first position and the second position of the electrical interface.

19. A computer system, comprising:
a docking station including a housing and an electrical interface supported by the housing, wherein the electrical interface of the docking station is movable between a first position and a second position angularly displaced from the first position, and is oriented substantially perpendicular to a first surface of the housing when in the first position and oriented substantially perpendicular to a second surface of the housing adjacent the first surface of the housing when in the second position; and a portable computer including an electrical interface configured to mate with the electrical interface of the docking station and electrically couple the portable computer with the docking station when the electrical interface of the docking station is in each the first position and the second position.

20. The computer system of claim 19, wherein the first position includes a substantially horizontal position and the second position includes a non-horizontal position.

21. The computer system of claim 19, wherein the docking station further includes an undocking system adapted to displace the portable computer relative to the housing of the docking station when the portable computer is electrically coupled with the docking station.

22. The computer system of claim 19, wherein the housing portion of the docking station includes a first housing portion and a second housing portion supporting the first housing portion, the first housing portion supporting the electrical interface of the docking station and being movable relative to the second housing portion to establish the first position and the second position of the electrical interface of the docking station.

23. The computer system of claim 22, wherein the first housing portion is rotatable relative to the second housing portion to establish the first position and the second position of the electrical interface of the docking station.

24. The computer system of claim 19, wherein the housing of the docking station includes a first electrical port and a second electrical port angularly displaced from the first electrical port, wherein the electrical interface of the docking station is selectively positionable in the first electrical port and the second electrical port to establish the first position and the second position of the electrical interface of the docking station.

25. The computer system of claim 19, wherein the electrical interface of the portable computer is provided on a side of the portable computer, wherein the electrical interface of the portable computer is configured to mate with the electrical interface of the docking station when the electrical interface of the docking station is in the first position.

26. A computer system, comprising:
a docking station including a housing and an electrical interface supported by the housing, wherein the electrical interface of the docking station is movable between a first position and a second position angularly displaced from the first position, and is oriented substantially perpendicular to a first surface of the housing when in the first position and oriented substantially perpendicular to a second surface of the housing adjacent the first surface of the housing when in the second position; and a portable computer including an electrical interface configured to mate with the electrical interface of the docking station and electrically couple the portable computer with the docking station, wherein the electrical interface of the portable computer is provided on a bottom of the portable computer, wherein the electrical interface of the portable computer is configured to mate with the electrical interface of the docking station when the electrical interface of the docking station is in the second position.

27. A docking station for a portable computer, the docking station comprising:
a housing including a first housing portion and a second housing portion supporting the first housing portion, the first housing portion having a surface and the second housing portion having two adjacent surfaces; and an electrical interface supported by the first housing portion, wherein the first housing portion is movable relative to the second housing portion to establish a first position of the electrical interface and a second position of the electrical interface angularly displaced from the first position, wherein the surface of the first housing portion is substantially aligned with one of the two adjacent surfaces of the second housing portion when the electrical interface is in the first position and substantially aligned with another of the two adjacent surfaces of the second housing portion when the electrical interface is in the second position, and wherein the electrical interface is configured to electrically couple the docking station and the portable computer when in each the first position and the second position.

28. The docking station of claim 27, wherein the first position includes a substantially horizontal position and the second position includes a non-horizontal position.

29. The docking station of claim 27, wherein the electrical interface is oriented substantially perpendicular to one of the two adjacent surfaces of the second housing portion when in the first position and oriented substantially perpendicular to another of the two adjacent surfaces of the second housing portion when in the second position.

30. The docking station of claim 27, wherein the electrical interface of the docking station is configured to mate with a corresponding electrical interface of the portable computer to electrically couple the docking station and the portable computer.

31. The docking station of claim 30, further comprising:
an undocking system adapted to displace the portable computer relative to the housing when the docking station and the portable computer are electrically coupled.

32. The docking station of claim 31, wherein the undocking system includes at least one ejector adapted to project from the housing and contact the portable computer when the docking station and the portable computer are electrically coupled.

33. The docking station of claim 27, wherein the first housing portion is rotatable relative to the second housing portion to establish the first position and the second position of the electrical interface.

34. The docking station of claim 27, wherein the electrical interface constitutes a first electrical interface supported by the first housing portion, and further comprising:
a second electrical interface supported by the second housing portion and electrically coupled to the first electrical interface,
wherein the second electrical interface is configured to electrically couple a peripheral device with the docking station.

35. The docking station of claim 34, wherein the first electrical interface is electrically coupled to the second electrical interface by an electrical circuit.

36. The docking station of claim 35, wherein the electrical circuit includes a flexible wire connector having a first end electrically coupled with the first electrical interface and a second end electrically coupled with the second electrical interface.

37. The docking station of claim 35, wherein the electrical circuit includes a first electrical contact electrically coupled with the first electrical interface and a second electrical contact electrically coupled with the second electrical interface and configured to contact the first electrical contact.

38. A method of docking a portable computer including an electrical interface with a docking station including a housing having a first housing portion and a second housing portion supporting the first housing portion and an electrical interface supported by the first housing portion, the method comprising:

moving the electrical interface of the docking station between a first position and a second position angularly displaced from the first position, including moving the first housing portion relative to the second housing portion, and substantially aligning the surface of the first housing portion with one of two adjacent surfaces of the second housing portion when the electrical interface is in the first position and substantially aligning the surface of the first housing portion with another of the two adjacent surfaces of the second housing portion when the electrical interface is in the second position; and electrically coupling the electrical interface of the portable computer with the electrical interface of the docking station when the electrical interface of the docking station is in each the first position and the second position.

39. The method of claim 38, wherein moving the electrical interface of the docking station between the first position and the second position includes moving the electrical interface between a substantially horizontal position and a non-horizontal position.

40. The method of claim 38, wherein moving the electrical interface of the docking station between the first position and the second position includes orienting the electrical interface substantially perpendicular to one of the two adjacent surfaces of the second housing portion when in the first position and orienting the electrical interface substantially perpendicular to another of the two adjacent surfaces of the second housing portion when in the second position.

41. The method of claim 38, further comprising:
undocking the portable computer from the docking station after electrically coupling the electrical interface of the portable computer with the electrical interface of the docking station, including displacing the portable computer relative to the housing of the docking station.

42. The method of claim 41, wherein displacing the portable computer relative to the bowing of the docking station includes contacting the portable computer with at least one ejector.

43. The method of claim 38, wherein moving the first housing portion relative to the second housing portion includes rotating the first housing portion relative to the second housing portion to establish the first position and the second position of the electrical interface.

44. The computer system of claim 19, wherein the electrical interface of the portable computer is provided on a bottom of the portable computer, wherein the electrical interface of the portable computer is configured to mate with the electrical interface of the docking station when the electrical interface of the docking station is in the second position.

45. The computer system of claim 26, wherein the first position includes a substantially horizontal position and the second position includes a non-horizontal position.

46. The computer system of claim 26, wherein the docking station further includes an undocking system adapted to displace the portable computer relative to the housing of the docking station when the portable computer is electrically coupled with the docking station.

47. The computer system of claim 26, wherein the housing portion of the docking station includes a first housing portion and a second housing portion supporting the first housing portion, the first housing portion supporting the electrical interface of the docking station and being movable relative to the second housing portion to establish the first position and the second position of the electrical interface of the docking station.

48. The computer system of claim 47, wherein the first housing portion is rotatable relative to the second housing portion to establish the first position and the second position of the electrical interface of the docking station.

49. The computer system of claim 26, wherein the housing of the docking station includes a first electrical port and a second electrical port angularly displaced from the first electrical port, wherein the electrical interface of the docking station is selectively positionable in the first electrical port and the second electrical port to establish the first position and the second position of the electrical interface of the docking station.

* * * * *

UNITED STATES PATENT AND TRADEMARK OFFICE
CERTIFICATE OF CORRECTION

PATENT NO. : 6,898,080 B2  Page 1 of 1
APPLICATION NO. : 10/678809
DATED : May 24, 2005
INVENTOR(S) : Memphis Zhihong Yin et al.

It is certified that error appears in the above-identified patent and that said Letters Patent is hereby corrected as shown below:

IN THE CLAIMS

Claim 6, Column 8, line 23, delete "decking" and insert therefor --docking--

Claim 17, Column 9, line 35, delete "pardon" and insert therefor --portion--

Claim 42, Column 12, line 37, delete "bowing" and insert therefor --housing--

Signed and Sealed this

Twenty-seventh Day of May, 2008

JON W. DUDAS
*Director of the United States Patent and Trademark Office*